(12) United States Patent
Ali et al.

(10) Patent No.: US 11,582,964 B2
(45) Date of Patent: Feb. 21, 2023

(54) INSECT TRAP

(71) Applicant: RENTOKIL INITIAL 1927 PLC, Camberley (GB)

(72) Inventors: Wajid Ali, Finchampstead Wokingham (GB); Gary Heaton, Leyland (GB); Michael Best, Totton Southampton (GB); Gary Wingett, Totton Southampton (GB); Victoria Rands, Wilton Salisbury (GB)

(73) Assignee: RENTOKIL INITIAL 1927 PLC, Camberley (GB)

( * ) Notice: Subject to any disclaimer, the term of this patent is extended or adjusted under 35 U.S.C. 154(b) by 0 days.

(21) Appl. No.: 16/185,685

(22) Filed: Nov. 9, 2018

(65) Prior Publication Data

US 2019/0104717 A1  Apr. 11, 2019

Related U.S. Application Data

(63) Continuation of application No. PCT/GB2017/053491, filed on Nov. 21, 2017.

(30) Foreign Application Priority Data

Nov. 21, 2016 (GB) .................................. 1619668

(51) Int. Cl.
*A01M 1/14* (2006.01)
*A01M 1/04* (2006.01)
(Continued)

(52) U.S. Cl.
CPC .............. *A01M 1/145* (2013.01); *A01M 1/02* (2013.01); *A01M 1/023* (2013.01); *A01M 1/04* (2013.01);
(Continued)

(58) Field of Classification Search
CPC .......... A01M 1/00; A01M 1/02; A01M 1/023; A01M 1/04; A01M 1/06; A01M 1/08;
(Continued)

(56) References Cited

U.S. PATENT DOCUMENTS 1,787,421 A * 12/1930 Ruddell .................. A01M 1/02
43/107
2,941,328 A * 6/1960 Streat .................... A01M 1/223
43/112
(Continued)

FOREIGN PATENT DOCUMENTS

CN  201715627 U  1/2011
EP  3162203 A1 * 5/2017 ............ A01M 1/145
(Continued)

OTHER PUBLICATIONS

International Search Report dated Feb. 7, 2018 for International Application No. PCT/GB2017/053491, filed Nov. 21, 2017.

*Primary Examiner* — David J Parsley
*Assistant Examiner* — Morgan T Jordan
(74) *Attorney, Agent, or Firm* — Dinsmore & Shohl LLP

(57) ABSTRACT

Certain aspects of the present disclosure provide an insect trap for trapping insects, the insect trap comprising one or more serviceable parts, the insect trap being movable between a first configuration for trapping insects, and a second configuration for servicing of the one or more serviceable parts. The insect trap is arranged so that the position of the one or more serviceable parts in the first configuration differs from the position of the one or more serviceable parts in the second configuration.

19 Claims, 4 Drawing Sheets

(51) Int. Cl.
*A01M 1/10* (2006.01)
*A01M 1/22* (2006.01)
*A01M 1/02* (2006.01)
*A01M 1/20* (2006.01)

(52) U.S. Cl.
CPC ............... *A01M 1/10* (2013.01); *A01M 1/14* (2013.01); *A01M 1/2005* (2013.01); *A01M 1/22* (2013.01); *A01M 1/223* (2013.01); *A01M 1/20* (2013.01)

(58) Field of Classification Search
CPC .......... A01M 1/10; A01M 1/106; A01M 1/14; A01M 1/22; A01M 1/223; A01M 1/245
See application file for complete search history.

(56) References Cited

U.S. PATENT DOCUMENTS

| | | | | | |
|---|---|---|---|---|---|
| 4,788,789 | A * | 12/1988 | Boobar | ................... | A01M 1/08 43/113 |
| 4,852,296 | A * | 8/1989 | Swanson | ................... | A01M 1/04 43/112 |
| 4,949,501 | A | 8/1990 | Larkin | | |
| 5,170,750 | A * | 12/1992 | Ricketts | ................. | A01K 39/012 119/52.3 |
| 5,425,197 | A * | 6/1995 | Smith | ..................... | A01M 1/14 43/113 |
| 5,651,211 | A * | 7/1997 | Regan | .................... | A01M 1/145 43/113 |
| 6,871,443 | B2 * | 3/2005 | Lambert | ............... | A01M 1/145 43/113 |
| 6,918,353 | B1 * | 7/2005 | Coroneos | ........... | A01K 39/0113 119/52.3 |
| 7,441,368 | B1 * | 10/2008 | Rieger | .................. | A01M 1/026 43/139 |
| 8,245,666 | B2 * | 8/2012 | Sena | .................... | A01K 39/012 119/57.8 |
| 8,572,890 | B1 * | 11/2013 | Lark | ..................... | A01M 1/145 43/113 |
| 9,578,865 | B1 * | 2/2017 | Lin | ........................ | G06F 3/005 |
| D825,024 | S * | 8/2018 | Wingett | ................ | A01M 1/145 D22/123 |
| 2002/0073611 | A1 * | 6/2002 | Greening | .............. | A01M 1/223 43/113 |
| 2002/0139040 | A1 * | 10/2002 | Burrows | ................ | A01M 1/145 43/113 |
| 2003/0089024 | A1 * | 5/2003 | Nelson | .................. | A01M 1/145 43/113 |
| 2003/0154644 | A1 * | 8/2003 | Lambert | ............... | A01M 1/145 43/107 |
| 2004/0065000 | A1 * | 4/2004 | Lambert | ............... | A01M 1/145 43/107 |
| 2005/0166445 | A1 * | 8/2005 | Lambert | ............... | A01M 1/145 43/113 |
| 2007/0124987 | A1 * | 6/2007 | Brown | .................. | A01M 1/023 43/113 |
| 2007/0169401 | A1 * | 7/2007 | Chyun | .................. | A01M 1/145 43/107 |
| 2008/0034643 | A1 * | 2/2008 | Chen | ...................... | A01M 1/04 43/112 |
| 2012/0005947 | A1 * | 1/2012 | Studer | ................... | A01M 1/145 43/58 |
| 2014/0026467 | A1 * | 1/2014 | Kaye | ..................... | A01M 1/145 43/113 |
| 2017/0086448 | A1 * | 3/2017 | Studer | ................... | A01M 1/145 |
| 2019/0075776 | A1 * | 3/2019 | Ali | ........................ | A01M 1/106 |
| 2019/0104717 | A1 * | 4/2019 | Ali | .......................... | A01M 1/10 |
| 2019/0364871 | A1 * | 12/2019 | Hazell | ................. | A01M 1/2038 |
| 2020/0138003 | A1 * | 5/2020 | Shoemaker, Jr. | ... | G09F 13/0413 |

FOREIGN PATENT DOCUMENTS

| | | | | |
|---|---|---|---|---|
| GB | 2459717 | A | 11/2009 | |
| GB | 2484806 | A * | 4/2012 | ............. A01M 1/026 |
| GB | 2486456 | A * | 6/2012 | ............. A01M 1/04 |
| GB | 2537397 | A | 10/2016 | |
| KR | 20100105078 | A | 9/2010 | |
| WO | 2007/139289 | A1 | 12/2007 | |
| WO | WO-2013059424 | A1 * | 4/2013 | ............. A01M 1/04 |

\* cited by examiner

INSECT TRAP

CROSS-REFERENCE TO RELATED APPLICATIONS

This Application is a continuation of PCT International Application PCT/GB2017/053491, filed on Nov. 21, 2017, which claims priority to GB Application No. 1619668.5, filed on Nov. 21, 2016. The contents of the aforementioned applications are herein incorporated by reference in their entirety.

INTRODUCTION

Field

The present invention concerns insect traps for trapping flying insects. More particularly, but not exclusively, this invention concerns an insect trap movable between a configuration for trapping insects providing a special a configuration for servicing the insect trap. The invention also concerns a method of servicing an insect trap.

Background

Insect traps are used globally to attract and kill flying insects. Insect traps, particularly insect traps having ultraviolet (UV) lamps, are often mounted above head height. Such insect traps are mounted above head height to reduce human exposure to UV radiation, and/or more generally to keep the insect trap out of the way. By way of example, certain manufactures of insect traps recommend that the underside of an insect trap is no lower than 1.8 m from the floor.

Mounting insect traps at height can lead to difficulties when servicing the insect traps. The Standing Vertical Grip Reach of a 5th percentile female is 180 cm from the ground. The comfortable common reaching zone of an average human is typically between about 120 cm and 90 cm from the ground. FIG. 7 shows these zones and illustrates therefore the problems in reaching insect trap 10. To access insect trap for servicing it is therefore typically necessary for a service technician to use steps or a ladder. Workplace use of ladders can be fraught with difficulties and has risks. For example, single handed use of an unsecured ladder can be unsafe, risk assessments and cordoning off of premises may be required, in some cases two personnel may be needed, and in general, working up a ladder is less safe and/or practical than working at ground level. These factors can increase the time, cost and risk associated with servicing insect traps.

The present invention seeks to mitigate the above-mentioned problems. Alternatively or additionally, the present invention seeks to provide an improved insect trap.

SUMMARY

The present invention provides, according to a first aspect, an insect trap for trapping flying insects, the insect trap comprising one or more serviceable parts, the insect trap being movable between: a first configuration for trapping insects, and a second configuration for servicing of the one or more serviceable parts; wherein the insect trap is arranged such that the position of the one or more serviceable parts in the first configuration differs from the position of the one or more serviceable parts in the second configuration.

The insect trap may be configured to trap and/or kill an array of insects, in particular flying insects. The insect trap may be arranged to actively kill the insects, for example by electrocution, and/or to passively kill the insects, for example by starvation.

The insect trap may comprise a number of parts as set out below.

The insect trap may comprise a lure for attracting insects. The lure may be a light source, for example in the UV spectrum. The lure may be an LED lamp and/or a fluorescent lamp. The lure may be some bait, a gas producing element and/or a scent producing element.

The insect trap may comprise a means for retaining insects within the insect trap. For example, the insect trap may comprise glue boards and/or an insect trapping volume from which insects struggle to escape.

The insect trap may comprise a means for retaining insect carcasses. For example, the insect trap may comprise glue boards and/or an insect carcass collection area, for example a tray.

The insect trap may comprise a means to actively kill the insects. For example, the insect trap may comprise a conducting element for electrocuting insects, gas to asphyxiate insects and/or poison to poison the insects.

The insect trap may comprise electronic and/or electric circuitry. The insect trap may comprise a fuse and/or a circuit breaker. The insect trap may comprise an electronic user interface.

The above parts may need to be serviced. The parts will therefore be referred to as serviceable parts.

It will be understood that servicing may include repairing the parts, replacing the parts, cleaning the parts, checking the parts are functioning correctly and/or generally maintaining the parts. In the case of an electronic user interface, it will be appreciated that servicing may more broadly include interacting with the user interface.

It will also be appreciated, however, that in some embodiments of the invention it may not be possible to service certain parts. For example, the parts may be fixed and/or integrally formed within the insect trap such that their removal is either difficult or impossible without damaging the insect trap.

An advantage of the first aspect of the invention is that one or more of the above serviceable parts may be moved from a position in which they are normally used to a position in which they can be more easily accessed for servicing. Such an arrangement may advantageously mean that the insect trap can be provided at an out-the-way and/or hard to access location and/or height. Then, without moving the entire insect trap, yet by re-configuring it to the second configuration, the one or more serviceable parts may be brought to a position where they can be more easily serviced. This may reduce or eliminate the need to utilise ladders or steps or the like to access insect traps for servicing.

It will also be appreciated that not all of the insect trap's parts may have different positions as between the first and second configurations. According to some embodiments, only the parts, which are considered consumable, i.e. could be readily expected to need replacing, are included in the one or more serviceable parts, which have different positions as between the first and second configurations.

The orientation of the one or more serviceable parts in the first configuration may also differ from the orientation of the one or more serviceable parts in the second configuration. Preferably, the orientation of the one or more serviceable parts in the second configuration allows them to be more easily serviced as compared to the first configuration.

Movement between the first configuration and the second configuration may comprise translation and/or rotation of the one or more serviceable parts.

The position of the one or more serviceable parts in the first configuration may be up to 30 cm, or 40 cm, or 50 cm, or 60 cm, or 70 cm, or 80 cm, or 90 cm, or 100 cm, or more than 100 cm from the position of the one or more serviceable parts in the second configuration.

The insect trap may be lockable in the first configuration and/or the second configuration. The insect trap may be lockable in a plurality of second positions; that is to say, the insect trap may be movable to a number of second positions and may be lockable in each position.

Preferably, when the insect trap is in an orientation for use, the movement between the first and second configuration changes the height of the one or more serviceable parts. When the insect trap is in an orientation for use, in the first configuration, the serviceable parts may be at a first height, and in the second configuration, the serviceable parts may be at a second height. The second height may be lower than the first height or the first height may be lower than the second height. The first height may be the same as the second height.

The first aspect of the invention may have particular application for insect traps mounted above the easy reach of most humans, for example on a wall, pillar or similar structure, or from a ceiling or the like. The insect trap may be wall mountable and/or ceiling mountable.

It is preferable that the insect trap is configured such that, if the first height is above the maximum common and/or comfortable common reaching zones, then the second height is within one of these zones. It is preferable that the insect trap is configured such that, if the first height is above about 180 cm from the floor, or above eye level of an average human, or above head level of an average human, then the second height is within the maximum common or comfortable common reaching zones.

The second height may be at least 30 cm, or 40 cm, or 50 cm, or 60 cm, or 70 cm, or 80 cm, or 90 cm, or 100 cm, or more than 100 cm lower or higher than the first height.

The insect trap may comprise a mounting portion. The mounting portion may comprise mounting means for mounting the insect trap to a structure, for example a wall, a ceiling, a pillar or the like. The mounting portion may comprise a backing plate for abutting a surface of a wall. The mounting portion may comprise a through hole, a slot and/or a key slot by which the mounting portion may be mounted. The mounting portion may comprise wire for suspending the insect trap from a ceiling. The mounting portion may be configured to be in substantially the same position in the first configuration as in the second configuration.

The insect trap may comprise a service portion. The service portion may retain the serviceable parts. The serviceable parts may be mountable to the service portion. The service portion may comprise mounting means for mounting the serviceable parts thereto. For example, the service portion may comprise slots for receiving glue boards; the service portion may comprise fixtures for retaining lamps; the service portion may comprise an area for receiving an insect carcass collection tray.

The service portion may be movably connected to the mounting portion. The position of the mounting portion relative to the service portion may define whether the trap is in the first configuration or the second configuration. In the first configuration, the service portion may be in a first position relative to the mounting portion. In the second configuration, the service portion may be in a second position relative to the mounting portion.

The service portion may be slideably connected to the mounting portion. The insect trap may be provided with slides, runners, rails, rods and/or the like, which connect the service portion to the mounting portion. Such connections may be multi-staged and/or telescopic.

The service portion may be rotatably connected to the mounting portion. The insect trap may be provided with pivots, gears and/or the like, which connect the service portion to the mounting portion.

The insect trap may comprise a damping mechanism for damping the movement of the insect trap from the first configuration to the second configuration and/or from the second configuration to the first configuration. The damping mechanism may be provided between the mounting portion and the service portion. The damping mechanism may be a damping piston. The damping mechanism may be a spring. The spring may be a constant tension spring. The spring may bias the insect trap towards the first configuration. The spring may bias the service portion towards the mounting portion.

In the first configuration, the service portion may be proximate the mounting portion. In the first configuration, the mounting portion and the service portion may mate. When the insect trap moves from the first configuration to the second configuration, the service portion may be moved away from the mounting portion. In the second configuration, the mounting portion and the service portion may be spatially separated (although still connected). When the insect trap moves from the second configuration to the first configuration, the service portion may be moved towards the mounting portion.

The insect trap may comprise an electric motor arranged to move the insect trap from the first configuration to the second configuration and/or from the second configuration to the first configuration.

An advantage of an insect trap according to the first aspect is that the mounting portion may be semi-permanently mounted, on a wall for example, at an out-the-way and/or hard to access location and/or height. During normal use of the insect trap the service portion may be proximate the mounting portion (in a first configuration) and therefore the insect trap as a whole may be provided at an out-the-way and/or hard to access location and/or height. When it comes to servicing the trap, the service portion can be moved to a position (in a second configuration) in which the one or more serviceable parts can be more easily accessed for servicing.

The insect trap may comprise an access door or the like. The access door may be openable for accessing of the one or more serviceable parts. It will be understood that opening of an access door may not constitute movement of the insect trap between the first configuration and second configuration.

As above, the insect trap may comprise a lamp for attracting insects. The lamp may be automatically turned off if the insect trap is moved from the first configuration to the second configuration. Likewise, the lamp may be automatically turned on if the insect trap is moved from the second configuration to the first configuration. The insect trap may comprise a sensor for detecting whether the insect trap is in the first configuration or the second configuration.

Similarly, the lamp may be automatically turned off if the access door is opened. Likewise, the lamp may be automatically turned on if the access door is closed. The insect trap may comprise a sensor for detecting whether the access door is open or closed.

The insect trap may comprise outer casing. The mounting portion may comprise outer casing and/or the service portion may comprise outer casing.

The insect trap may comprise a locking mechanism for locking the insect trap in a first configuration. The insect trap may not be movable to the second configuration until the locking mechanism is unlocked. The locking mechanism may be provided with a key or key code or the like for unlocking.

According to a second aspect of the invention there is also provided a method of servicing an insect trap, the insect trap comprising one or more serviceable parts, the method comprising the following steps: moving the insect trap from a first configuration, in which the insect trap is arranged to trap insects, to a second configuration, in which the insect trap may be serviced, by moving the position of the serviceable parts; servicing the serviceable parts; and moving the insect trap from the second configuration to the first configuration.

It is envisaged that the method may be of particular advantage where the insect trap is provided at a hard to access, out-the-way, high up and/or low down location; for example, a location above or below the maximum common or comfortable common reaching zones. The insect trap may be provided in such a location in the first configuration for use. The serviceable parts may then be moved to a more accessible location and/or height for servicing of the one or more serviceable parts. The step of servicing the insect trap may therefore take place without the need for ladders, steps, or the like to gain access to the insect trap.

The step of moving the insect trap from a first configuration to a second configuration may comprise moving the serviceable parts from a higher position to a lower position. The step of moving the insect trap from a second configuration to a first configuration may comprise moving the serviceable parts from a lower position to a higher position. By way of example, the higher position may be above the maximum common or comfortable common reaching zone, above about 1.8 m from the ground, above the eye and/or head level of an average human. The lower position may preferably be within the maximum common or comfortable common reaching zone.

The step of moving the insect trap from a first configuration to a second configuration may comprise moving the serviceable parts from a lower position to a higher position. The step of moving the insect trap from a second configuration to a first configuration may comprise moving the serviceable parts from a higher position to a lower position. By way of example, the lower position may be below the maximum common or comfortable common reaching zone. The higher position may preferably be within the maximum common or comfortable common reaching zone.

The insect trap according to the second aspect may incorporate any of the features of the insect trap according to the first aspect.

The step of servicing may comprise at least one of repairing, replacing, cleaning and/or maintaining the one or more serviceable parts.

The step of moving the insect trap from the first configuration to the second configuration may comprise moving the service portion relative to the mounting portion. For example, it may comprise moving the service portion away from the mounting portion and/or lowering the service portion relative to the mounting portion.

The step of moving the insect trap from the second configuration to the first configuration may comprise moving the service portion relative to the mounting portion. For example, it may comprise moving the service portion towards the mounting portion and/or moving the service portion upwards relative to the mounting portion.

The insect trap may be mounted to the wall, preferably via the mounting portion.

According to a third aspect of the invention there is also provided an insect trap for trapping flying insects, the insect trap comprising: a mounting portion for mounting the insect trap, and a service portion for retaining one or more serviceable parts, the service portion being movably connected to the mounting portion; wherein the insect trap is movable between: a first configuration for trapping insects, and a second configuration for servicing; wherein the position of the mounting portion in the first configuration differs from the position of the mounting portion in the second configuration.

The insect trap according to the third aspect may comprise one or more serviceable parts retained within the service portion.

The insect trap according to the third aspect may incorporate the features of the insect trap according to the first aspect and/or the second aspect.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
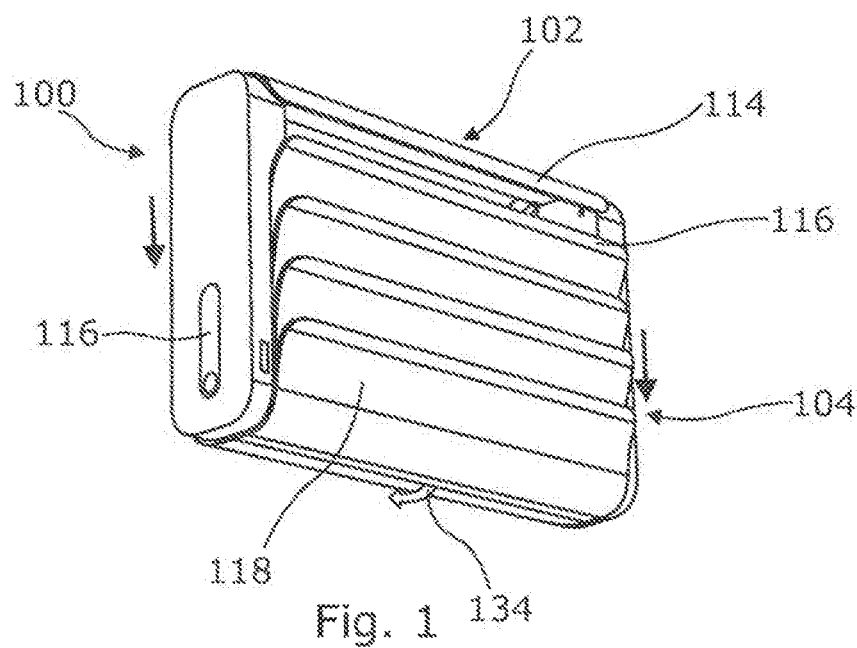
FIG. 1 shows a perspective view of an insect trap in a first configuration according to a first embodiment of the invention.

FIGS. 1 to 6 show an insect trap 100 according to a first embodiment of the invention. The insect trap 100 comprises a mounting portion 102 and a service portion 104. The service portion 104 is connected to the mounting portion 102 via a connecting portion in the form of slides 106. The slides also each comprise (not shown) a constant tension spring, connecting the two portions. A power cable 108 also connects the service portion 104 to the mounting portion 102.

The mounting portion 102 has a backing plate 110. The backing plate 110 is provided with through holes 112 for mounting the backing plate, and therefore the mounting portion 102, to a wall. The mounting portion 102 also has roof 114, which is provided at the top of the mounting portion 102.

The service portion 104 comprises side elements 116, access door 118 and back element 120. The access door 118 covers substantially the whole front of the service portion 104. The access door 118 is pivotally mounted to the bottom of the side elements 116 so that opening the access door 118 provides access to the inside of the service portion 104.

Figure 4:
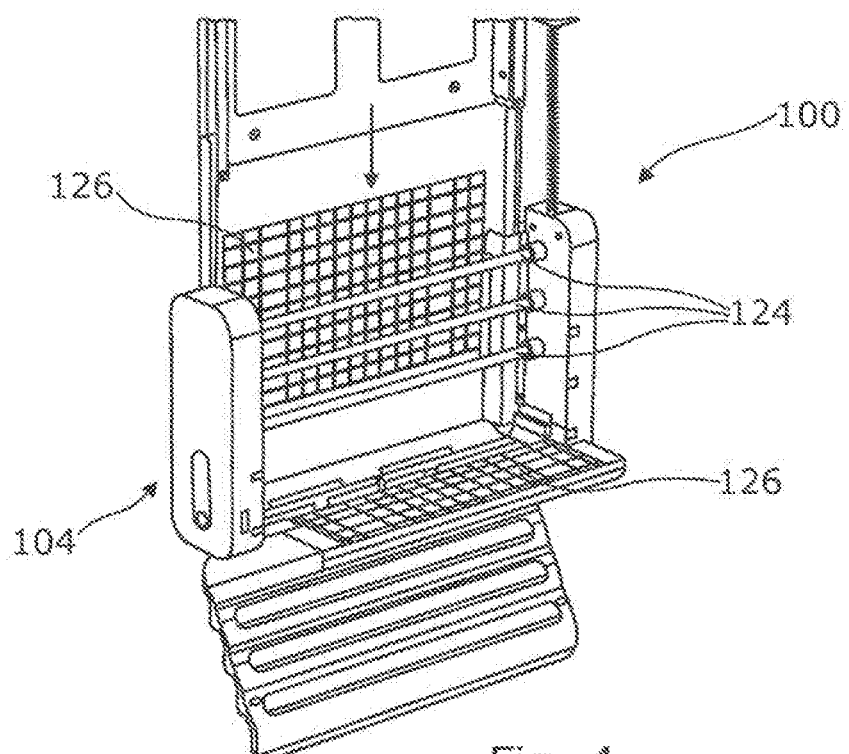
Figure 5:
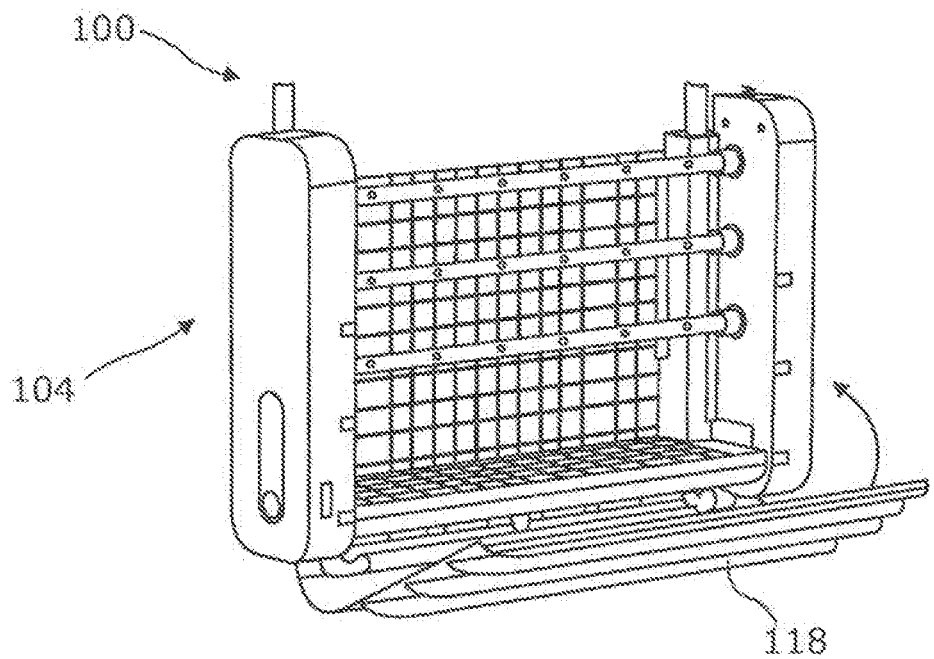

As can be seen in FIGS. 4 and 5, the service portion contains serviceable parts of the insect trap 100 including UV lamps 124 and glue boards 126. The UV lamps 124 are retained in lamp fittings 128 in the side elements 116. The glue boards 126 are slideably retained in glue board holders 130 behind and beneath the UV lamps 124.

The access door 118 is provided with openings in the form of horizontal slots 132. The slots 132 allow light from the UV lamps 124 to radiate into the surroundings and allow insects attracted to the UV light to enter the insect trap 100. They are positioned to reduce the UV light directed down in the direction of people.

FIG. 1 shows the insect trap 100 in a first configuration. As can be seen, the service portion 104 is in that configuration proximate the mounting portion. The side elements 116 of the service portion 104 mate with the roof 114 of the mounting portion 102. The insect trap 100 is in its most compact arrangement.

Lock mechanism 134 is provided on the underside of the service portion 104. When the insect trap 100 is in the first configuration, the lock mechanism 134 locks the service portion 104 to the mounting portion 102 and retains it in position.

Figure 2:
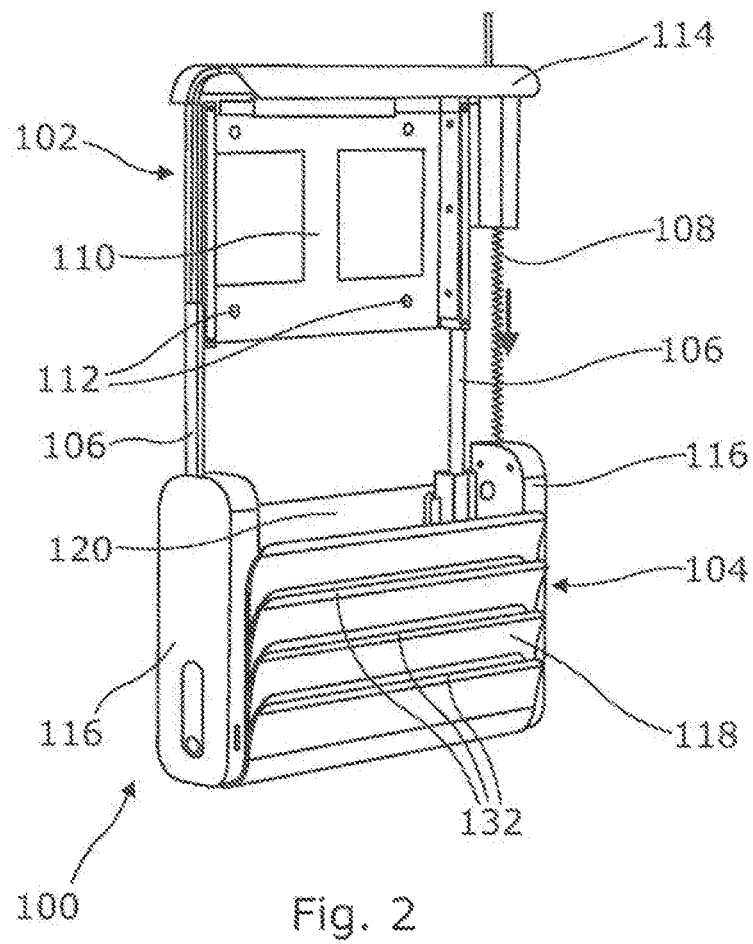
FIG. 2 shows a perspective view of an insect trap moving to a second configuration according to a first embodiment of the invention.
Figure 3:
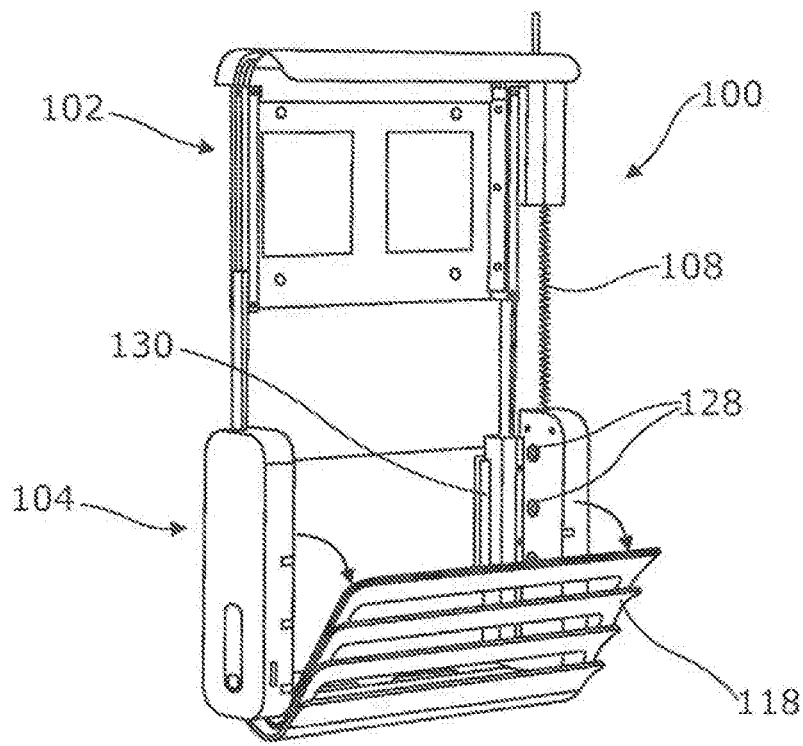
FIGS. 3 to 5 each show a perspective view of an insect trap being serviced according to a first embodiment of the invention.

FIGS. 2 to 4 show the insect trap 100 in a second configuration. As can be seen, the service portion 104 is disposed below the mounting portion 102. The rails 106 support the service portion 104 beneath the mounting portion 102 and define the extent by which the service portion 104 may move away from the mounting portion 102.

In the embodiment shown, the mounting portion 104 is in that configuration supported by the bottom of the rails 106. In alternative embodiments, the rails may be provided with a second locking mechanism to allow the mounting portion to be supported at one or more other heights before the end of the rails. The most comfortable servicing height may therefore be chosen by the service engineer from these heights.

As the mounting portion 104 is mounted in a fixed position, for example to a wall or ceiling or the like, then the position of the serviceable parts retained in the service portion 104 are in a different position in the second configuration compared to the first configuration.

As may now be readily understood, the insect trap 100 may be mounted to a wall at a suitable height so that UV radiation from the UV lamps 124 is emitted above people's heads when the insect trap 100 was in the first configuration, yet, by moving the insect trap 100 to the second configuration, the UV lamps 124 and the glue boards 126 could be serviced at a comfortable working height without the need to use ladders or steps to access the insect trap 100.

The constant tension spring contained within each slide 106 provides a constant force pulling the service portion 104 towards the mounting portion 102. The spring in each slide 106 therefore damps the downward movement of the mounting portion, which may otherwise simply fall under gravity if not let gently downwards by a user.

Item 108 provides power to the serviceable section whilst lowered to assist in the servicing activity.

An embodiment of a method of servicing the insect trap 100 will now be described with reference to FIGS. 1 to 6 and in accordance with a second embodiment of the invention.

In this embodiment, the insect trap 100 is initially provided in a first configuration as shown in FIG. 1. A key (not shown) is inserted into locking mechanism 134 and rotated to unlock the service portion 104 from the mounting portion 102. The service portion 104 is then lowered with respect to the mounting portion 102 as shown in FIG. 2. To do this the service portion 104 slides on the rails 106. The springs within the slides 106 acts to damp the downward movement of the service portion 104. As the service portion 104 is initially lowered, any high voltage power going serviceable portion is isolated leaving a low power input to support servicing activity.

Once the service portion 104 has been lowered to the end of the rails 106, the serviceable parts retained within the service portion 104, in this case the UV lamps 124 and the glue boards 126 are at a position for easy servicing. As shown in FIG. 3, the access door 118 is then opened to provide access to these serviceable parts. FIG. 3 does not show the UV lamps 124 and the glue boards 126 for clarity in showing the lamp fittings 128 and the glue board holders 130.

According to this embodiment of the method, the insect trap is serviced by inspecting the UV lamps 124 and the glue boards 126 and replacing them if necessary. As shown in FIG. 4, the glue boards are replaced by sliding them in and out of the glue board holders 130. It is arranged that, despite the lamps being automatically turned off as the service portion 104 is lowered, power to the lamps can be manually restored to check their operation. The control circuit is provided with a button to allow the service engineer to do that. The control circuit also provides information, which the service engineer can utilize for an efficient servicing process, such as time since the last service and total time in use of the UV lamps. The service engineer notes the data and takes any action indicated by it, as well as providing input noting what service action has been taken and the date.

Figure 6:
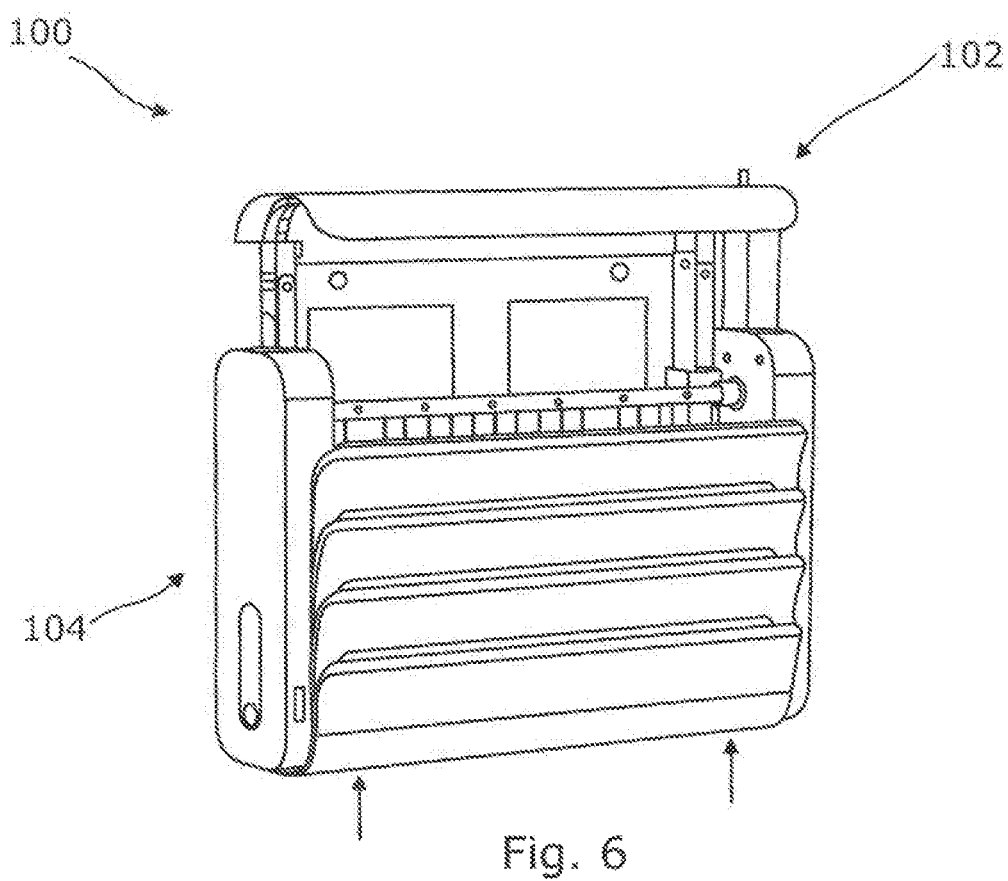
FIG. 6 shows a perspective view of an insect trap moving to the first configuration according to a first embodiment of the invention.
Figure 7:
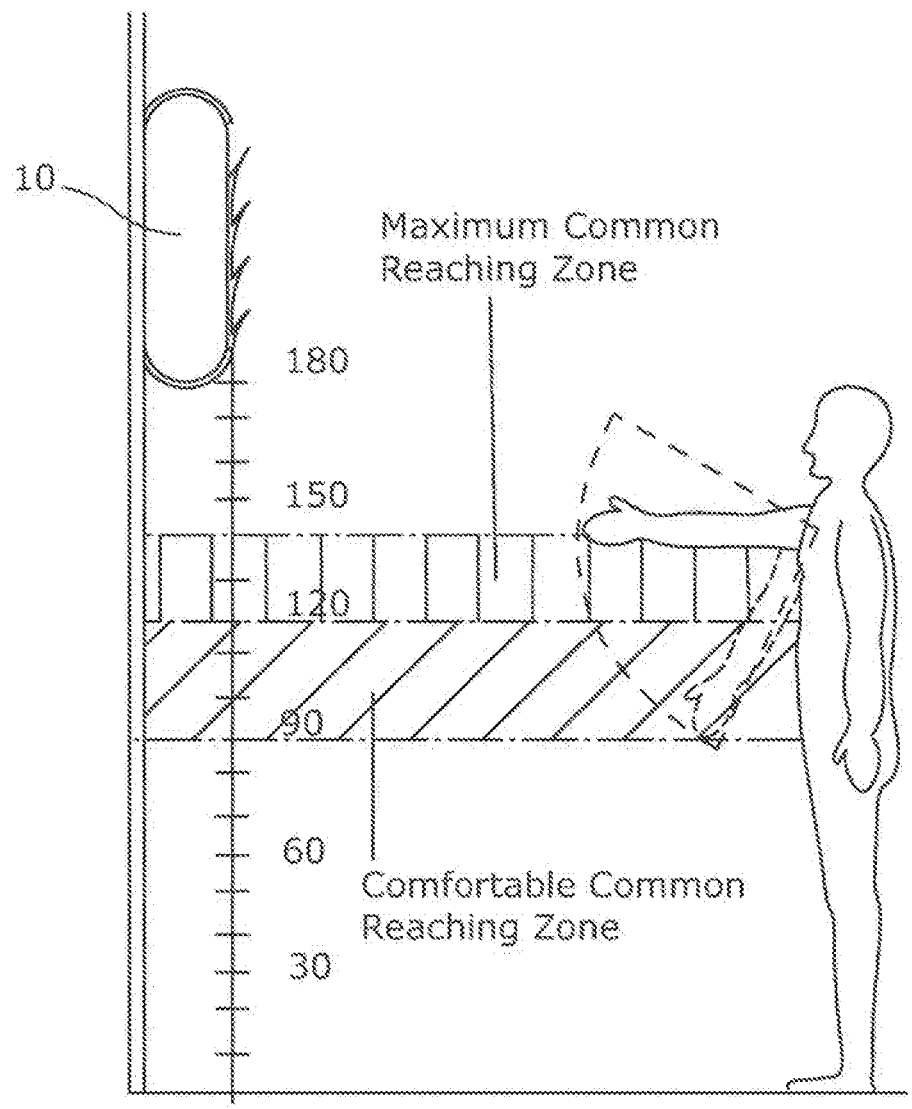
FIG. 7 shows reach zones relative to an insect trap.

Once servicing has been completed, the access door 118 is closed by rotating it upwards as shown in FIG. 5. Thereafter, the insect trap is moved to the first configuration by pushing the service portion 104 upwards and towards the mounting portion 102 as shown in FIG. 6. As the service portion is locked into the first configuration, any high voltage power going to the UV lamp is automatically restored. When the service portion 104 and mounting portion 102 mate, in the first configuration, the mounting portion 102 and the service portion 104 are locked together by using the locking mechanism 134. The lock may automatically lock as the portions mate or may be a manual lock that uses the key to perform that operation.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

According to alternative embodiments of the invention, the service portion may comprise different combinations of serviceable parts. For example, instead of glue boards, the service portion may comprise an electrified grid for electrocuting insects and an insect carcass collection tray disposed below the electrifying grid. For servicing, the collection tray is removed, emptied and cleaned.

According to further alternative embodiments of the invention, the mounting portion may also comprise serviceable parts. Such an apportionment of parts may be applicable where the parts in the mounting portion are particularly reliable and long lasting, and therefore are not likely to need servicing, and the parts in the service portion are consumable, and therefore require frequent servicing. Having serviceable parts in the mounting portion may have an advantage that heavier such parts need not be moved when the insect trap is moved from the first configuration to the second configuration. For example, the mounting portion may comprise various electrics and also parts such as a UV lamp whilst the service portion comprises only glue boards.

According to an alternative embodiment of the invention, an insect trap may be provided having a similar structure to insect trap 100, except the rails 106 are oriented such that the service portion 104 may be moved horizontally outward. Such an embodiment may be useful, for example, if in the first configuration the insect trap was recessed into a wall. In other embodiments the rails 106 may be oriented such that service portion 104 may be moved upwards.

According to further alternative embodiments of the invention, the service portion is pivotally connected to the mounting portion. The pivot is disposed at the bottom of the mounting portion such that the service portion rotates outwards and downwards when the insect trap moves towards the second configuration. The rear of the service portion may be open such that the one or more serviceable parts are thereby accessible in the second configuration.

What is claimed is:

1. An insect trap, comprising:
a mounting portion for mounting the insect trap;
a service portion slideably connected to the mounting portion via one or more slide rails and comprising:
serviceable parts, including:
a UV Lamp; and
a glue board slideably retained within the service portion; and
an access door,
wherein:
the service portion is slideable via the one or more slide rails between:
a first configuration for trapping insects, and
a second configuration for servicing of the serviceable parts,
the insect trap is arranged so that, when mounted, the service portion is configured to slide from the first configuration downward and away from the mounting portion to the second configuration, while staying connected to the mounting portion via the one or more slide rails; and
the one or more slide rails define an extent by which the service portion may move downward and away from the mounting portion; and
a damping mechanism configured for damping a movement of the service portion from the first configuration to the second configuration.

2. The insect trap of claim 1, wherein the damping mechanism comprises a constant tension spring connecting a first portion of a slide rail of the one or more slide rails to a second portion of the slide rail of the one or more slide rails.

3. The insect trap of claim 1, wherein:
the access door is movable between a first position and a second position,
in the first position, the access door at least partially covers the serviceable parts, and
in the second position, the access door exposes the serviceable parts.

4. The insect trap of claim 3, wherein
the access door comprises a plurality of horizontal slots configured to direct light from the UV lamp in an upward direction when in the first position.

5. The insect trap of claim 4, further comprising: a sensor configured to remove power from the UV lamp when the access door is not in the first position.

6. The insect trap of claim 4, further comprising: a sensor configured to remove power from the UV lamp when the service portion is not in the first configuration.

7. The insect trap of claim 1, further comprising: a power cable connecting between the mounting portion and the service portion and configured to provide power to at least the UV lamp.

8. The insect trap of claim 1, wherein the service portion further comprises:
a glue board holder configured to retain the glue board.

9. The insect trap of claim 1, wherein each of the one or more slide rails comprises a constant tension spring.

10. The insect trap of claim 1, further comprising: a locking mechanism configured for locking the service portion in the first configuration.

11. The insect trap of claim 1, wherein:
the mounting portion further comprises a roof,
the service portion further comprises a plurality of parallel side elements, and
when in the first configuration, the roof mates with the plurality of parallel side elements to enclose the serviceable parts.

12. The insect trap of claim 1, wherein at least one of the one or more slide rails comprises the damping mechanism.

13. A method of servicing an insect trap,
the insect trap comprising;
a mounting portion for mounting the insect trap;
a service portion slideably connected to the mounting portion via one or more slide rails and comprising:
serviceable parts; and
an access door; and
a damping mechanism configured for damping a movement of the service portion from a first configuration to a second configuration,
the method comprising:
sliding the service portion from the first configuration, in which the insect trap is arranged to trap insects, to the second configuration, in which the insect trap may be serviced, including:
sliding the service portion downward and away from the mounting portion while staying connected to the mounting portion via the one or more slide rails,
wherein the one or more slide rails define an extent by which the service portion moves downward and away from, and stays slideably connected to, the mounting portion to reach the second configuration;
servicing the serviceable parts including a UV lamp and a glue board slideably retained within the service portion; and
sliding the service portion from the second configuration to the first configuration.

14. The method of claim 13, wherein the sliding the service portion from the first configuration to the second configuration moves the serviceable parts from a higher position to a lower position.

15. The method of claim 13, wherein the sliding service portion from the first configuration to the second configuration comprises: moving the serviceable parts from a first position above about 180 cm above ground to a second position in which the serviceable parts are between 140 cm and 90 cm above ground.

16. An insect trap, comprising:
a mounting portion for mounting the insect trap;
a service portion slideably connected to the mounting portion via one or more slide rails and comprising:
  serviceable parts, including:
    a UV Lamp; and
    a glue board slideably retained within the service portion; and
  an access door,
wherein:
  the service portion is slideable via the one or more slide rails between:
    a first configuration for trapping insects, and
    a second configuration for servicing of the serviceable parts,
  the insect trap is arranged so that, when mounted, the service portion is configured to slide from the first configuration downward and away from the mounting portion to the second configuration, while staying connected to the mounting portion via the one or more slide rails;
  the one or more slide rails define an extent by which the service portion may move downward and away from the mounting portion;
  the access door is movable between a first position and a second position,
    in the first position, the access door at least partially covers the serviceable parts, and
    in the second position, the access door exposes the serviceable parts; and
  the access door comprises a plurality of horizontal slots configured to direct light from the UV lamp in an upward direction when in the first position.

17. The insect trap of claim 16, further comprising: a sensor configured to remove power from the UV lamp when the access door is not in the first position.

18. The insect trap of claim 16, further comprising: a sensor configured to remove power from the UV lamp when the service portion is not in the first configuration.

19. A method of servicing an insect trap,
  the insect trap comprising:
    a mounting portion for mounting the insect trap;
    a service portion slideably connected to the mounting portion via one or more slide rails and comprising:
      serviceable parts; and
    an access door, wherein the access door is movable between a first position and a second position,
      in the first position, the access door at least partially covers the serviceable parts, and
      in the second position, the access door exposes the serviceable parts; and
    the access door comprises a plurality of horizontal slots configured to direct light from the UV lamp in an upward direction when in the first position,
  the method comprising:
    sliding the service portion from the first configuration, in which the insect trap is arranged to trap insects, to the second configuration, in which the insect trap may be serviced, including:
      sliding the service portion downward and away from the mounting portion while staying connected to the mounting portion via the one or more slide rails,
      wherein the one or more slide rails define an extent by which the service portion moves downward and away from, and stays slideably connected to, the mounting portion to reach the second configuration;
    servicing the serviceable parts including a UV lamp and a glue board slideably retained within the service portion; and
    sliding the service portion from the second configuration to the first configuration.

\* \* \* \* \*